Dec. 27, 1927.  E. RYDER  1,653,667
MOTOR VEHICLE HEATER
Filed Feb. 7, 1927
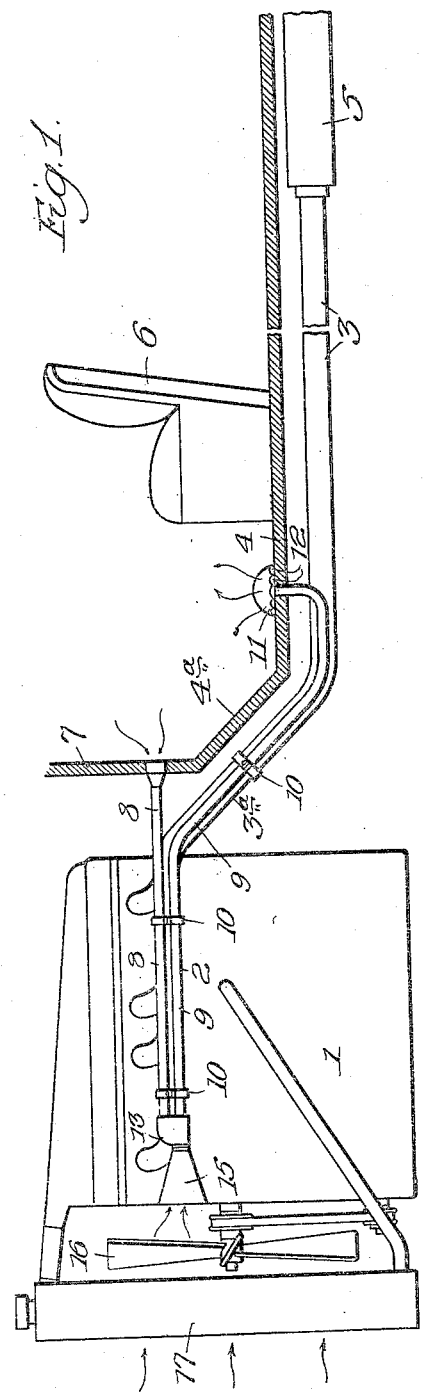
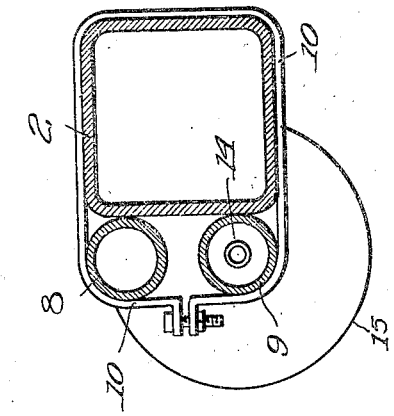
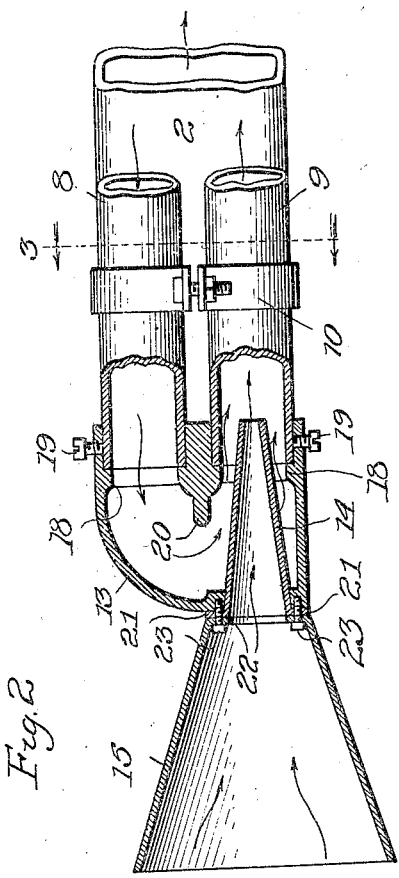
Inventor
Elmer Ryder, Patented Dec. 27, 1927.

1,653,667

UNITED STATES PATENT OFFICE.

ELMER RYDER, OF ELGIN, ILLINOIS.

MOTOR-VEHICLE HEATER.

Application filed February 7, 1927. Serial No. 166,399.

This invention relates to improvements in motor vehicle heaters, and more particularly to heaters by which heated air is supplied to the vehicle body for car warming purposes.

One object of my invention is to provide a heater which takes its main supply of air from the interior of the car body and thus has warmer air to deal with than should the heater take its air supply from the colder air which is exterior of the car body. This is an important feature because the heat furnished by the exhaust gases of the engine will raise the temperature of the air passing through the air conveying conduit of the heater much higher than the temperature of the air entering the heater conduit from the car body, and thus furnish the car body with warmer air than taken from it.

A further object of my invention is to provide means whereby a draft is created through the air conveying conduit of the heater so as to insure drawing the air supply from the interior of the car body, no matter in what position the intake and discharge ends of the air conveying conduit may be, whether at the same level or at different levels, as one above the other.

A further object of my invention is to create the air flow through the air conveying conduit by an injector action through the introduction of enough outside air into the conduit through a nozzle which discharges into the conduit in the direction of air flow therethrough.

Other and further objects of my invention will appear from the following specification, taken in connection with the accompanying drawings, in which—

Fig. 1 is a side view showing the heater assembly of my invention applied to a motor vehicle;

Fig. 2 is an enlarged longitudinal vertical sectional view through the portion of the air conveying conduit at the return fitting; and Fig. 3 is a transverse vertical sectional view taken on line 3—3 of Fig. 2.

The heater assembly of my invention is employed in connection with the explosion engine 1 of a motor vehicle and its exhaust manifold 2 and connected exhaust pipe 3, respectively. The exhaust pipe 3 extends rearward from the engine 1 beneath the floor 4 of the car and terminates in a muffler 5 at the rear of the car, as usual. The section 3ª of the exhaust pipe just after leaving the manifold 2 extends at a downward inclination beneath the upwardly inclined portion 4ª of the floor of the car in front of the driver's seat 6. This inclined portion 4ª extends to the upright dash 7, as usual.

A pair of conduits or pipes 8, 9 are clamped against the front side of the manifold 2 by suitable straps 10, 10 in superimposed relation. The upper conduit 8 extends to the dash 7 and opens therethrough, as shown in Fig. 1, so that air may be drawn into said conduit from the interior of the car body in the operation of the heater.

The lower conduit 9 extends along the manifold 2 and continues along and in contact with the inclined section 3ª of the exhaust pipe 3 to a point rearward of where said inclined section joins the horizontal portion of the exhaust pipe beneath the floor 4 of the car. At this place the conduit 9 extends upward through the floor 4 in advance of the front seat 6 so that the heated air furnished by the heater may be discarged into the car body at the floor and in advance of said seat. A distributing cowl 11 is secured over the discharge end of the conduit 9 and has a multiplicity of outlet openings 12 in its margin at the floor 4, as shown in Fig. 1.

The forward ends of the conduits 8 and 9 are connected by a return fitting 13, which may be in the form of a casting. A tapered nozzle 14 extends into the fitting 13 through its front wall in line with the lower conduit 9. A funnel-like intake member 15 is secured to the front end of the nozzle 14 and serves to direct air into the nozzle from the fan 16, which is located between the radiator 17 and the engine 1, as in motor car design.

As shown in Fig. 2, the inner end of the nozzle 14 extends for a short distance into the lower conduit 9 and, being tapered, discharges the air supplied through the funnel 15 at high velocity into said conduit. This produces an injector action on the upper conduit 8 and thus serves to draw the main supply of air for the heater from the interior of the car body instead of from the colder outside air as with hot air heaters as heretofore most generally employed. With the main air supply for the heater taken from the interior of the car body, the air at the time of entering the conduit 8 is much warmer than the outside air and thus on being heated from the manifold 2 and exhaust pipe 3 as such air passes through the conduits 8 and 9, it is discharged into the car body at the cowl 11 at a much higher temperature than the air already within the car body. In this way, the interior of the car body is effectively heated, as the temperature of the air discharged into the car body at the cowl 11 is as many degrees higher than the body of air within the car body as the degrees of heat which are supplied to the air passing through the conduit 8—9 by the hot exhaust gases flowing through the manifold 2 and its connected exhaust pipe 3. In other words, instead of basing the rise in temperature of the air supplied by the heater on the temperature of the colder outside air, the rise is based on the warmer air within the car body. If, for example, the temperature of the air within the car body is 40 or 50 degrees, and the air temperature is raised by the exhaust conduit 2—3 10 or 12 or more degrees, the air as supplied by the heater is raised to 50 or 60 degrees, as the case may be. If the main supply of air for the heater was drawn entirely from the outside air, and that was at 20 or 30 degrees, the air as furnished to the car by the heater would only be raised to 30 or 40 degrees, and this would be relatively cold as compared with taking the air supply for the heater from the interior of the car body as in accordance with my invention. Consequently, in cold weather, when a heater is most needed, the car is more effectively warmed by my improved heater than with one which depends for its air supply on the cold outside air.

The nozzle 14, in discharging into the lower conduit 9, in addition to producing the injector action referred to, also creates a forced flow of air through both conduits and thus discharges the heated air into the car body at a relatively high velocity so as to displace the colder air which tends to lie on the floor of the car and create a circulation within the car body. The amounts of outside air discharged into the conduit 9 are relatively small and are quickly mixed with the warm air flowing through the conduit so as not to have any appreciable cooling effect thereon. Moreover, with the air conveying conduit having its two sections in contact with the exhaust conduit, substantially the entire length of the heater conduit is subjected to the heat furnished by the exhaust gases, with the result that the air passing through the heater conduit is effectively heated before being discharged into the car body.

As shown in Fig. 2, the fitting 13 is so made that it has a pair of openings at its rear end to receive the front ends of the conduits 8 and 9. The fitting is cast with inside ribs 18 which surround these openings so as to provide stops for the ends of the conduits. Set screws 19, 19 may be employed for fastening the ends of the conduits in the openings in the fitting. The latter has a centrally disposed partition 20 arranged between the conduits 8, 9 and extending part way into the fitting beyond where the ends of the conduits are attached thereto so as to cause the warmer air entering the fitting through the conduit 8 to pass around the partition to enter the conduit 9.

The nozzle 14 and its funnel-shaped intake member 15 may be made in one piece. I have shown these members made in two parts in Fig. 2. When so made, the nozzle and intake member 15 are provided with suitable flanges 21, 22 at their adjacent ends so that they may be connected together and the entire assembly secured to the front wall of the fitting 13 by screws 23, as shown.

The conduits 8 and 9 may be made from flexible tubing so as to lessen the cost of the assembly and also permit the conduit 9 to be bent and lie along the inclined section 3ᵃ of the exhaust pipe 3, and also to have the discharge end of the conduit bent upward to reach the floor 4 of the car. While I have shown this discharge end in front of the front seat 6, it is of course to be understood that the conduit could be made to discharge into the car body at any other place, as for instance between the front and rear seats or through the upwardly inclined portion 4ᵃ of the floor at the dash 7.

With the nozzle 14 providing means whereby a draft is created through the heater conduit, the intake and discharge ends of said conduit may open into the car body at the same level or at different levels as shown in Fig. 1. As there illustrated, the intake opening is above the discharge opening and, with a draft being created in the conduit, the warm air within the body will be drawn into the upper opening even though warm air tends to rise toward the top of the body.

The details of structure and arrangement of parts may be variously changed and modified without departing from the spirit and scope of my invention.

I claim as my invention:

1. The combination with a motor vehicle explosion engine, of a heater assembly for the vehicle, comprising an air conveying conduit to be heated through the medium of the exhaust gases of the engine, said conduit having its opposite ends opening into the vehicle body for the intake and discharge of air, respectively, and means for injecting outside air into the conduit at a relatively high velocity for creating a flow of air through the conduit from the body of the vehicle.

2. The combination with a motor vehicle explosion engine having an exhaust conduit, of a heater assembly for the vehicle, comprising a pair of air conveying conduits secured to and extending along the exhaust conduit so as to be heated thereby, said air conveying conduits having their rear ends opening into the body of the vehicle for the intake and discharge of air, respectively, a return fitting connecting the forward ends of the conduits together so that air may flow from one conduit to the other, and injector means at said fitting for creating a flow of air from the vehicle body into one conduit and discharging the heated air into the vehicle body from the other conduit.

3. The combination with a motor vehicle explosion engine having an exhaust pipe and connected manifold, of a heater assembly for the vehicle, comprising a pair of conduits extending along the exhaust pipe and manifold, respectively, to be heated thereby, said conduits having their rear ends opening into the body of the vehicle for the intake and discharge of air, respectively, a return fitting connecting the forward ends of the conduits together so that air may flow from one conduit to the other, and means at said fitting for injecting outside air into one conduit at a relatively high velocity for creating a flow of air from the vehicle body into one conduit and discharging the heated air into the vehicle body from the other conduit.

4. The combination with a motor vehicle explosion engine having an exhaust manifold, of a heater assembly for the vehicle, comprising a pair of conduits extending along the manifold to be heated thereby, said conduits having their rear ends opening into the vehicle body for the intake and discharge of air, respectively, a return fitting connecting the front ends of the conduits together so that air may flow from one conduit to the other, and an air intake nozzle associated with the fitting and discharging into one of the conduits to create a flow of air from the vehicle body into one conduit and discharging the heated air into the vehicle body from the other conduit.

5. The combination with a motor vehicle explosion engine having an exhaust manifold, of a heater assembly for the vehicle, comprising a pair of conduits secured to the manifold so as to be heated thereby, said conduits having their rear ends opening into the vehicle body for the intake and discharge of air, respectively, a return fitting connecting the front ends of the conduits together, a nozzle extending through the fitting and discharging into one of the conduits for creating a flow of air therethrough toward the vehicle body, and a funnel-shaped air intake member for said nozzle.

In testimony whereof I affix my signature this 2nd day of February, 1927.

ELMER RYDER.